United States Patent
Jun

(10) Patent No.: US 6,731,711 B1
(45) Date of Patent: May 4, 2004

(54) SIGNAL RECOVERY SYSTEM

(75) Inventor: Jung Sig Jun, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/131,387

(22) Filed: Aug. 7, 1998

(30) Foreign Application Priority Data

Nov. 19, 1997 (KR) ........................................... 97/61160
May 15, 1998 (KR) ........................................... 98/17621

(51) Int. Cl.[7] ............................................... H04L 7/00
(52) U.S. Cl. ...................................... 375/368; 370/509
(58) Field of Search ................................. 375/354, 365, 375/366, 368; 370/509, 510, 512, 513

(56) References Cited

U.S. PATENT DOCUMENTS

| | | | | |
|---|---|---|---|---|
| 3,796,956 A | * | 3/1974 | Fudemoto et al. | 375/293 |
| 5,596,582 A | * | 1/1997 | Sato et al. | 370/203 |
| 5,646,698 A | * | 7/1997 | Yang et al. | 348/475 |
| 5,652,541 A | * | 7/1997 | Yang et al. | 329/300 |
| 5,751,689 A | * | 5/1998 | Hoshino et al. | 369/275.3 |
| 5,757,869 A | * | 5/1998 | Sands et al. | 375/366 |
| 6,060,898 A | * | 5/2000 | Arkin | 324/765 |

* cited by examiner

Primary Examiner—Young T. Tse
(74) Attorney, Agent, or Firm—Birch, Stewart, Kolasch & Birch, LLP

(57) ABSTRACT

A symbol recovery system for a digital VSB signal finds sync pattern correlations in the incoming signal. The present symbol sync acquisition circuit also accounts for static which distort the signal during transmission. Initially, both positive and negative sync pattern correlations are accorded equal weight, with the non sync pattern correlations being accorded a negative weight. Values are accumulated in a segment integrator and stored in a FIFO having a location for each symbol position in a segment. A comparator initially produces an output when sync pattern correlations are found that add to a given value. After a relatively small number of correlations, as tabulated in a confidence counter, a VCO is enabled to change its frequency under control of error pulses based upon the symbol sync. After a greater number of sync pattern correlations, the symbol position in the segment is fixed, sliding to a new symbol location in the FIFO is precluded, the signal polarity is determined and changed if necessary, and a higher threshold is established for the comparator.

20 Claims, 10 Drawing Sheets

SIGNAL RECOVERY SYSTEM

BACKGROUND OF THE INVENTION

The present invention relates to a signal recovery system and more particularly to a symbol synchronization (sync) recovery system for a vestigial sideband (VSB) digital signal.

The recently adopted advanced digital television signal standards are directed to a multilevel signal having two frames of data segments, each frame consisting of 313 segments as shown in FIG. 1. The first segment of each frame includes a two level frame sync signal and each segment has 832 multilevel symbols, wherein the first four symbols of each segment defines a two level segment sync pattern. A small pilot signal is added to aid in carrier recovery in the receiver. The receiver preferably includes a frequency and phase locked loop (FPLL) for recovering the transmitted signal. The data in the transmitted signal is subjected to precoding, interleaving and forward error correcting to provide noise protection and to assist in the rejection of cochannel NTSC signals.

An important requirement of a receiver is the ability to rapidly and accurately achieve symbol acquisition under field operational conditions. The nominal symbol frequency is 10.76 megasymbols per second and ideally, the receiver should acquire symbol frequency lock over a range exceeding +/−70 parts per million (ppm) in under 200 milliseconds.

The related sync signal recovery system has some difficulty achieving the desired symbol acquisition. For example, accurate symbol acquisition is hampered by unacceptable signal-to-noise levels. Moreover, during the transmission of the VSB signal, the original signal sync symbol pattern acquires static such as ghost signals. The ghost signals distort the original sync symbol pattern and prevent an accurate detection of the sync location. Consequently, ghost signals can detrimentally delay the symbol acquisition.

OBJECTS OF THE INVENTION

An object of the present invention is to solve at least the problems and disadvantages of the related art.

A further object of the present invention is to rapidly acquire signal synchronization.

Another object of the present invention is to improve the capacity for signal synchronization.

Another object of the present invention is to accurately recover the original sync signal.

Another object of the present invention is to prevent unnecessary delay caused by noise signals.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWING

The invention will be described in detail with reference to the following drawings in which like reference numerals refer to like elements wherein.

DESCRIPTION OF THE PREFERRED EMBODIMENT

Figure 1:
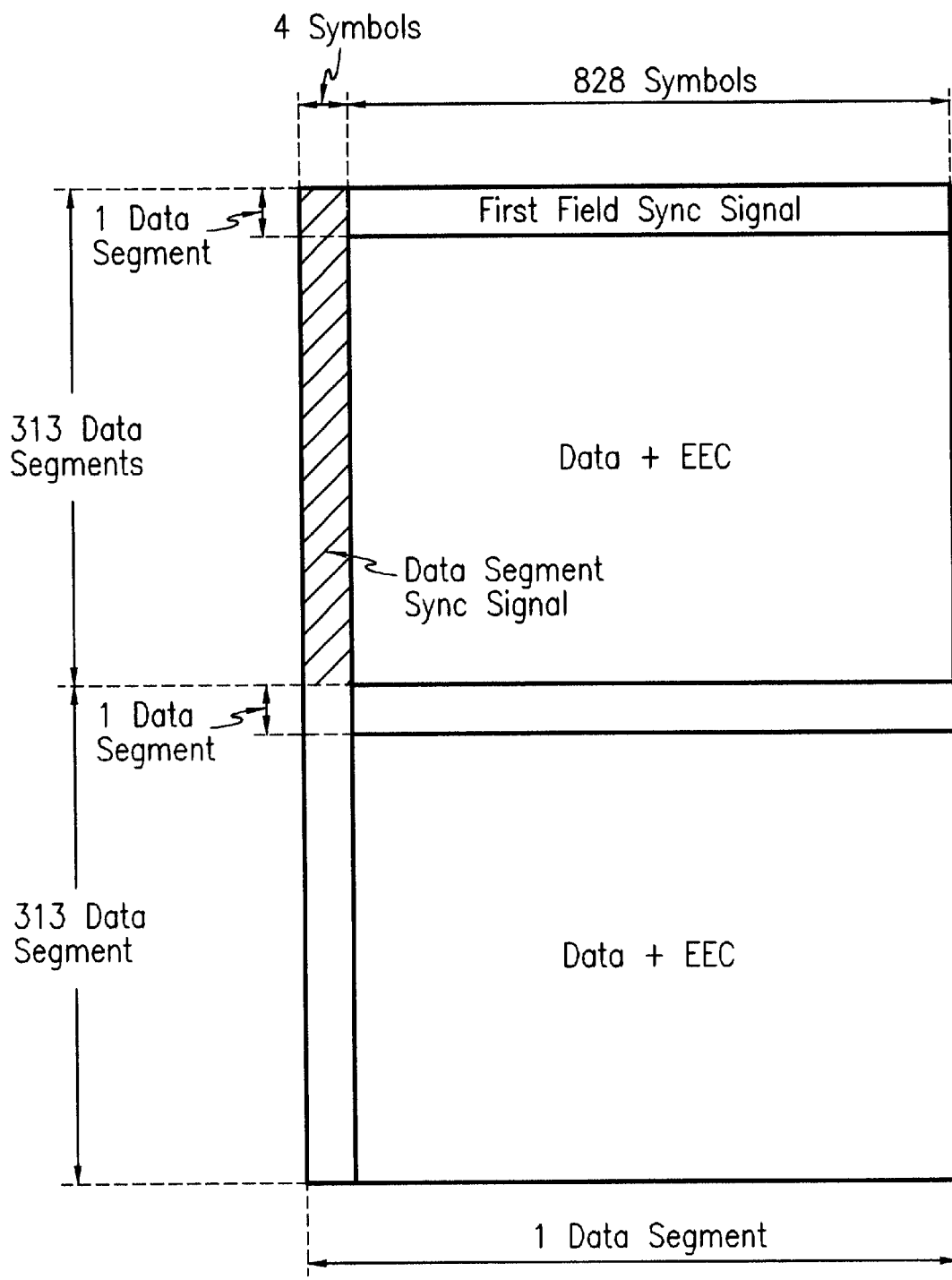
FIG. 1 shows a standard multilevel television signal.
Figure 2:
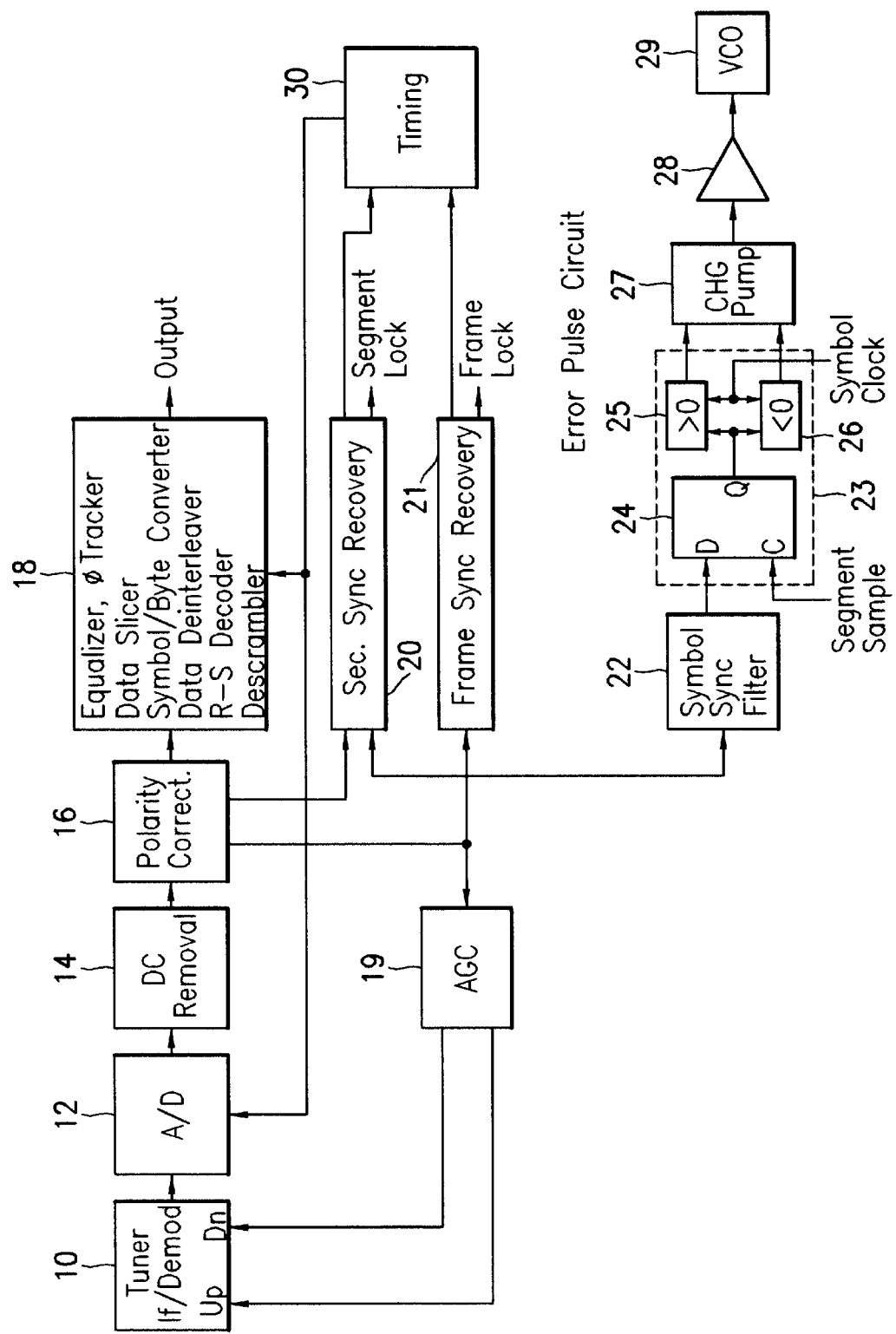
FIG. 2 is a block diagram of a digital VSB signal receiver that incorporates the invention.

Referring to FIG. 2, a digital VSB signal receiver includes a tuner, IF and demodulator 10 that functions to recover a transmitted VSB signal. Such arrangement preferably incorporates a frequency and phase locked loop (FPLL) for rapidly acquiring the signal using the small pilot in the transmitted signal. The demodulated signal is supplied to an analog-to-digital (A/D) converter 12 wherein the baseband signal is converted to a plurality of multilevel symbols. A/D converter 12 supplies the symbols to a DC removal circuit 14 where any DC, including the pilot, is removed. The signal is then passed to a polarity correction circuit 16 where its polarity can be reversed, if desired, since the demodulator FPLL is biphase stable and can lock up in either of two phases. The signal is applied to a signal processing block 18 that includes an equalizer, a phase tracker and data slicer, a symbol-to-byte converter, a data deinterleaver, an R-S decoder and a signal descrambler.

The output of polarity correction circuit 16 is also supplied to a segment sync recovery circuit 20, a frame sync recovery circuit 21, a symbol sync filter 22 and an automatic gain control (AGC) circuit 19. The AGC circuit 19 supplies suitable up and down control signals to the tuner, IF and demodulator 10 for controlling the level of the incoming signal. Symbol sync filter 22 supplies an error pulse circuit 23 that includes a flip-flop 24 supplying a pair of counters 25 and 26. The outputs of the counters 25 and 26 are coupled to a charge pump 27 that supplies a voltage controlled crystal oscillator (VCO) 29 through a low pass filter 28. The segment sync output of segment sync recovery circuit 20, the frame sync output of frame sync recovery circuit 21 and the output of VCO 29 are all supplied to a timing block 30 that develops appropriate timing signals, including those supplied to A/D 12 and signal processing block 18, and an enabling signal for error pulse circuit 23. A segment lock signal and a frame lock signal are also developed from the corresponding segment sync and frame sync recovery circuits 20 and 21.

As mentioned above, the baseband signal may have either of two polarities, depending upon the lock up phase of the demodulator FPLL (not shown). In the digital VSB system approved by the FCC, the sync pattern consists of four successive two level symbols having polarities of +−−+(or '1001'). The opposite polarity version of this sync pattern is therefore −++−(or '0110'). In the preferred embodiment, the data symbol stream is searched for correlations with both of these patterns until confidence is established that the sync pattern has been found, at which time the polarity of the received signal is changed, if necessary, to produce the desired symbol polarity. In the preferred embodiment, the symbol frequency in the received signal is approximately 10.76 megasymbols per second and that the frequency of VCO 29 is set to a nominal value and incremented or decremented as required to achieve a lock condition with the received symbol frequency. However, other frequency settings may be used.

Figure 3:
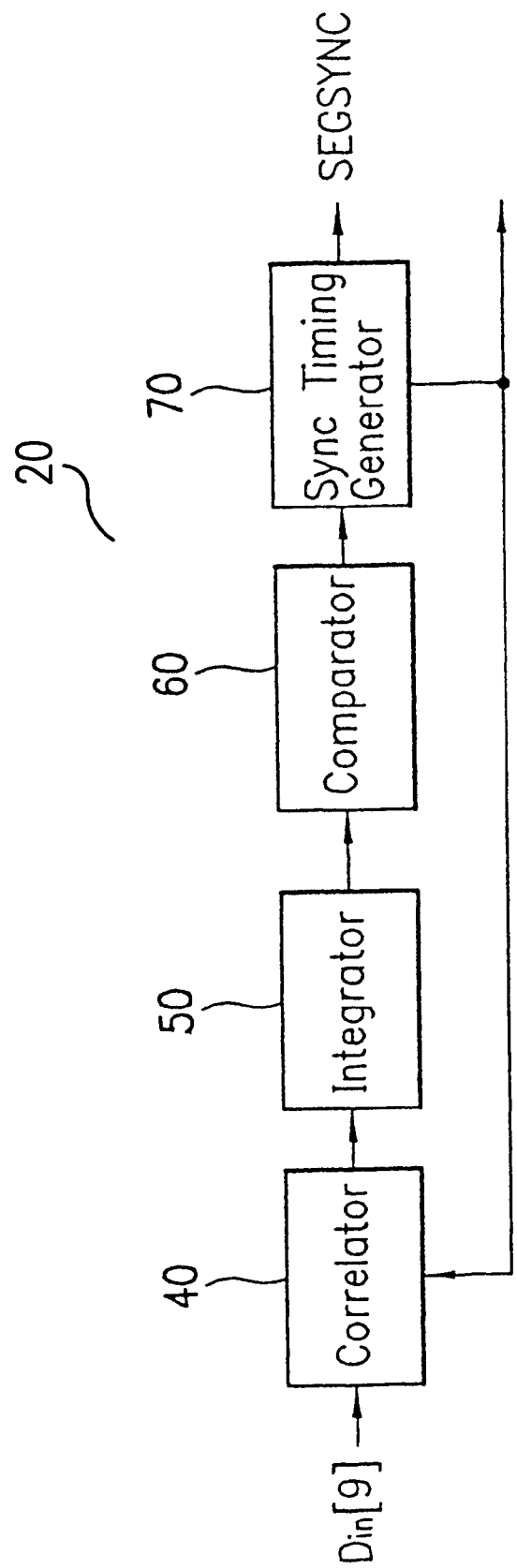
FIG. 3 is a block diagram of a segment sync recovery.
Figure 4:
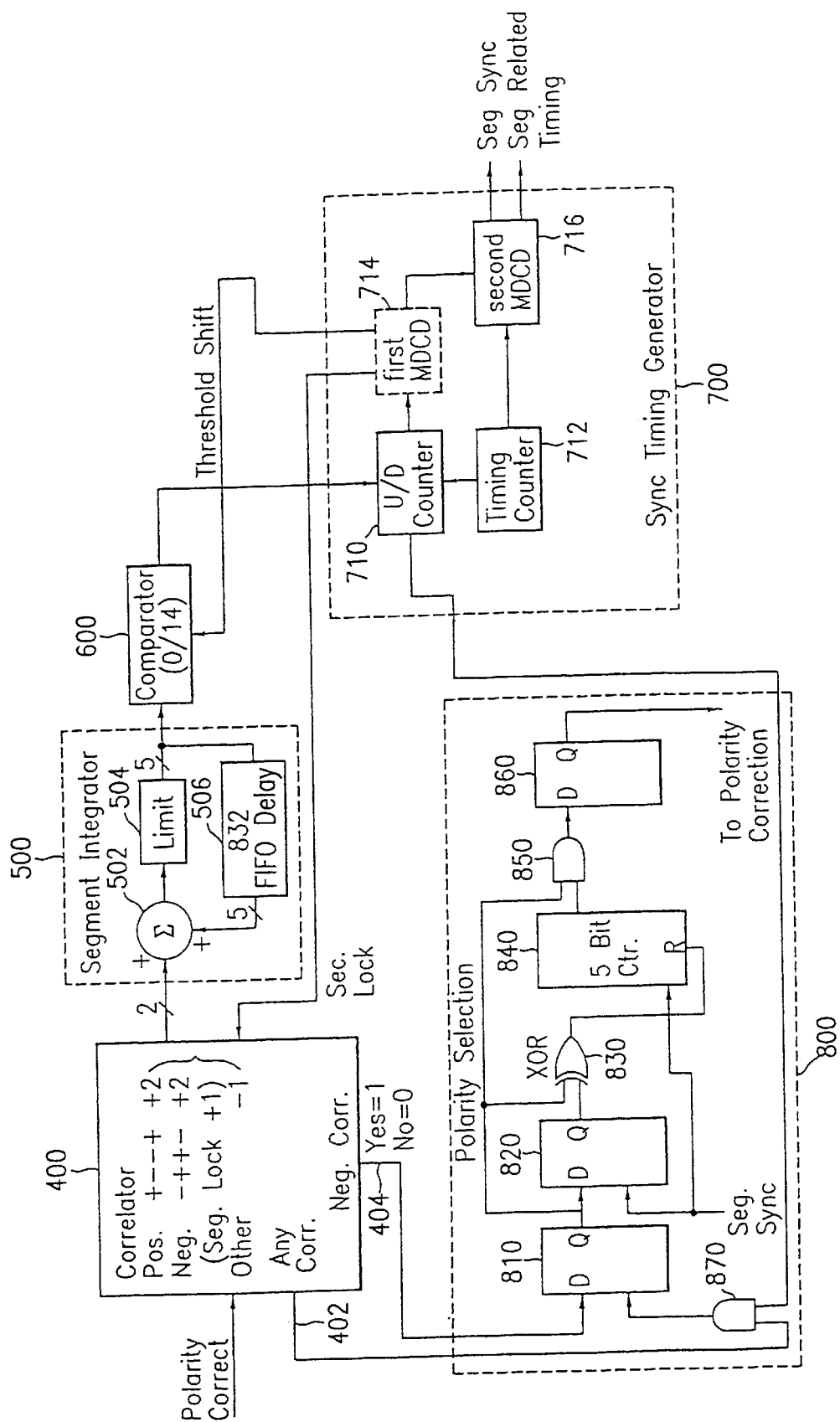
FIG. 4 is a combination schematic and block diagram of a segment sync recovery arrangement that incorporates the invention.

FIG. 3 shows a block diagram and FIG. 4 shows a circuit diagram of a segment sync recovery circuit 20 for searching successive groups of four symbols for the positive and negative sync symbol patterns described above. Referring to FIG. 3, a segment sync recovery circuit includes a correlator 40, an integrator 50, a comparator 60, and a sync timing generator 70 corresponding respectively to a correlation circuit 400, a segment integrator 500, a comparator 600 and a sync timing generator 700 of FIG. 4. In FIG. 4, the correlation circuit 400 searches successive groups of four symbols for the positive and negative sync symbol patterns described above. Since the correlation circuit is concerned with polarities of the received symbols, it is apparent that many four symbol groupings may correlate with the two level sync symbol patterns. As indicated, a positive or a negative sync correlation is assigned a +2 value for a segment integrator 500 that includes an adder 502, a limiter 504 and an 832×5 bit FIFO 506. After segment lock has been achieved, as evidenced by a segment lock signal being generated, the value assigned to a negative sync correlation is reduced from +2 to +1. (At the time of segment lock, there is a high level of confidence that sync has been located and the negative pattern correlations are afforded less weight in an effort to rapidly attain symbol lock.) Non sync pattern correlations of four symbol groups are assigned a value of −1. Segment sync integrator 500 has a range of −16 to +15 and is initially set at −16. However, the range may be set at a higher or lower number depending on the accuracy of the results desired.

Figure 5:
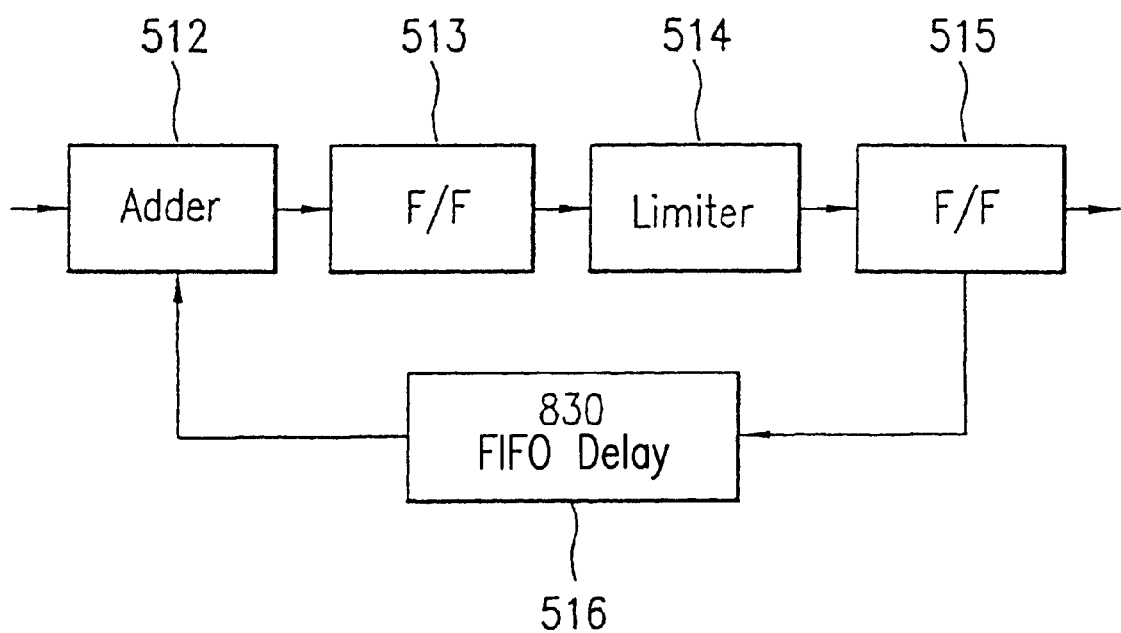
FIG. 5 is a block diagram of an integrator.

FIG. 5 shows a block diagram of a segment integrator 500 in accordance with an alternate preferred embodiment. The segment integrator 500 includes adder 512, first flip-flop 513, a limiter 514, second flip-flop 515, and an 830×5 bit FIFO 516. In such arrangement, the adder 512 and limiter 514 function in the same manner as adder 502 and limiter 504. However, the flip-flops 513 and 515 hold one symbol each and together with the FIFO 516, all 832 symbols are timely processed to the comparator 600.

Referring back to FIG. 4, the output of segment integrator 500 is supplied to a comparator 600 that, in accordance with the invention, has two different threshold levels for determining its output. Initially, the threshold levels for an output from comparator 600 is set at 0. This threshold value is changed to +14 when a threshold shift signal is generated, as will be discussed. The output of comparator 600 is supplied to a sync timing generator 700. Alternatively, the output of comparator 600 may be supplied to a polarity selection circuit 800 as shown in FIG. 4. As can be appreciated, the polarity selection circuit 800 may be omitted.

The polarity selection circuit 800 includes a flip-flop 810 and a flip-flop 820 supplying an exclusive OR (XOR) gate 830 and an AND gate 850. The XOR gate 830 is coupled to the reset terminal of a 5 bit counter 840, the output of which is coupled to AND gate 850. The AND gate 850 supplies the T input of a flip-flop 860 that produces an output signal for polarity correction circuit 16 when the count in counter 840 reaches a preselected number, in this case 32. The flip-flop 810 is triggered by the output of an AND gate 870 that receives one input from comparator 600 and another input from an "any (sync pattern) correlation" output 402 of correlation circuit 400. A "negative (sync pattern) correlation" output 404 of correlation circuit 400 supplies the D input of flip-flop 810. The operation is such that, if 32 consecutive negative sync pattern correlation outputs are received, the polarity selection circuit 800 will generate a signal for polarity correction circuit 16 to change the polarity of the baseband signal. (It should be noted that the polarity of the signal may be changed at the demodulator output should that be preferable).

The sync timing generator 700 includes a confidence (U/D) counter 710, a timing counter 712, and a first and second multicount decoders (MDCD) 714 and 716. The timing counter 712 and confidence counter 710 by first MDCD 714 are both coupled to second MDCD 716 that outputs the segment sync location signal. The first MDCD 714 also outputs other segment related signals as will be discussed below. The timing counter 712 continuously counts in a loop (generally from 1 to 832 or the number of symbols per segment), and outputs an enablement signal upon achieving a particular count. Concurrently, the confidence counter 710 receives a control signal from the comparator 600, when a sync pattern correlation at a symbol location attains a predetermined threshold. The enablement signal activates the confidence counter 710 to verify if the control signal received from the comparator 600 coincides with the count from the timing counter 712. If the count and the control signal correspond, then the confidence counter 710 increases by one count, but otherwise, the confidence counter decreases by one count, until the segment lock signal is generated.

Figure 6:
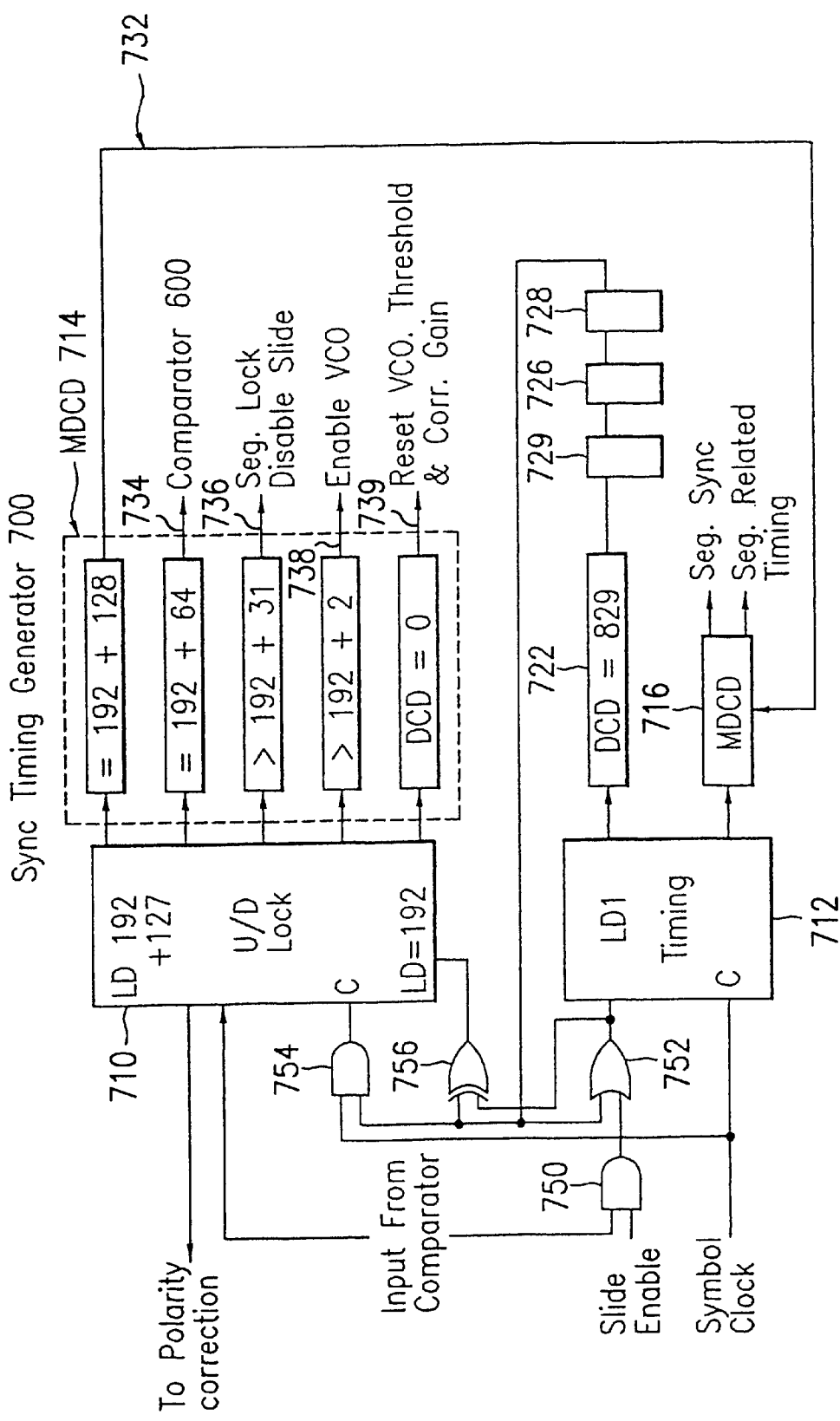
FIG. 6 is a circuit diagram of a sync timing generator that incorporates the invention.

FIG. 6 shows a detailed schematic circuit diagram of a sync timing generator according to one aspect of this invention. The sync timing generator 700 includes an Up and Down (UP/DN) counter 710 and first MDCD 714 separated into a 192+128 decode output 732, a 192+64 decode output 734, a greater than 192+31 decode output 736, a greater than 192+2 decode output 738 and a 0 decode output 739. UP/DN counter 710 functions as a confidence counter. The 192 is an arbitrary preset for the purposes of hysteresis on the reset signal. A timing counter 712 is also supplied with the output of comparator 600, via AND gate 750 and an OR gate 752. A symbol clock signal is supplied to the clock input of timing counter 712 and to one input of an AND gate 754, the output of which is coupled to the clock input of UP/DN counter 710. The other input of AND gate 754 is connected in parallel with an input of an XOR gate 756 and an input of OR gate 752. XOR gate 756 loads the 192 count preset into confidence counter 710. The output of OR gate 752 is coupled to the other input XOR gate 756. An 829 count decoder 722 and a multicount decoder 716 are coupled to timing counter 712. Decoder 722 operates when timing counter 712 achieves a count of 829 and decoder 716 operates when timing counter 712 achieves a count that correspond to segment sync and other segment related timings. The other input of AND 750 is supplied with a normal Slide Enable signal which permits the arrangement to move among the symbol locations identified in FIFO 506. The Slide Disable signal generated by the decode output 68 precludes such shifting and is obviously only generated when a substantial degree of confidence has been achieved as to the location of the sync in the signal.

In operation, the sync pattern correlation patterns (both positive and negative) identified for each of the 832 symbol locations are reinforced by the action of segment integrator 500. When the number of net sync pattern correlations at any symbol positions, corresponding to any one location in FIFO 506, reaches a count of zero (for each location the segment counter is started at −16), comparator 600 generates an output that clocks confidence counter 710, which is loaded with a preset count of 192. Successive sync pattern correlations is the same symbol location result in further outputs from comparator 600 which generates an output whenever the output of segment integrator 500 is over the threshold of zero. When confidence counter 710 has attained a count exceeding 192+2, the VCO 29 is enabled to change its frequency based upon error pulse signals received from error pulse circuit 23 that represent differences in frequency between the baseband symbol frequency and the VCO frequency. When more than 31 successive outputs of comparator 600 are received for the symbol position, the Segment Lock signal is generated along with the Slide Disable signal. The Segment Lock signal causes correlator 400 to change the value assigned to negative correlations from a +2 to a +1. The Slide Disable signal precludes the resetting of UP/DN counter 710 and a change in timing counter 712 and indicates a high degree of confidence that sync has been found.

Simultaneously, the polarity selection circuit 800 keeps a count on the number of successive negative correlations of the sync pattern. The two inputs to AND gate 870 are active whenever any sync pattern correlations (negative or positive) is found by correlation circuit 400, coincident with an output from comparator 600. The negative correlation output 404 of correlation circuit 400 is high whenever a negative correlation output 404 of correlation is found. This output is applied to the D input flip-flop 810 and results in a Q output being applied to the D input of flip-flop 820, to an input of AND 850 and to an input of XOR 830. Counter 840 and flip-flop 820 are clocked by the segment sync signal. When counter 840 reaches the count of 32, it supplies an output to the other input of AND 850. Counter 840 will be reset by the output of XOR 830 whenever the negative correlation output 404 of correlation circuit 400 indicates a positive (not negative) correlation. Thus it takes 32 successive negative sync pattern correlations from correlation circuit 400 to indicate that the sync that has been found at that FIFO location is of negative polarity. Such finding results in a signal from the polarity correction circuit 800 to polarity circuit 16 to change the signal polarity.

As successive outputs from comparator 600 occur, indicating that the symbol position continues to reflect the presence of the sync pattern, the confidence counter 710 continues counting up. When the count reaches 192+64, the threshold shift signal is produced which results in the threshold for comparator 600 being raised to +14 from 0. Thereafter, only outputs from segment integrator 500 of +14 or more will produce an output from comparator 600. This condition indicates a very high degree of confidence that sync has been located and essentially discriminates against values corresponding to other symbol locations in the FIFO, yielding a very high immunity to noise.

The two different threshold levels are selected based upon values in confidence counter 710. This enables rapid acquisition of sync location when the VCO and symbol frequencies are far apart and the acquisition of high noise and error immunity when the frequencies are close. Thus the present invention provides the benefits of wide acquisition and good performance at low signal-to-noise levels.

As discussed above, as the VCO is attempting to match the symbol frequency, the segment timing can be reset (allowed to slide to a new symbol location in FIFO 506) based upon the value in confidence counter 710. The resetting of segment timing provides for proper VCO correction sampling as the two frequencies continue to slide past each other prior to frequency lock.

Confidence counter 710 provides a substantial amount of hysteresis during sync acquisition to prevent loss of VCO correction during the beat notes that occur when the frequencies are very close to each other. Also the entire circuit resets when all confidence is lost to prevent lockout conditions from occurring.

Symbol sync is maintained by using an error signal derived from the four segment symbols as a correction factor for the VCO. Segment sync is found before symbol lock, as described and illustrated with reference to FIG. 3. The present invention accepts either polarity of sync until polarity can be determined and altered, if necessary. In the preferred embodiment, (assigning a value of +2 to either sync pattern and a value of −1 to all other patterns), the correlator drives the segment integrator value to +15 for correlated patterns and to −16 for uncorrelated patterns. The initial threshold level of zero requires only eight correlated symbol patterns to determine initial sync position.

When the sync position is known, the polarity is sampled and a polarity correction is made, if necessary. Also, the VCO correction circuitry is triggered based upon segment sync and the confidence counter 710 reaching the preset value of +2. Thus, with only ten segments, the symbol clock can begin pulling in, which yields a pull in range of 120 ppm (10 segments×832 symbols=8320; $1/8320=0.000120$). If the VCO is over 120 ppm off, the correction pulses will not start before the segment location as the two frequencies slide past each other.

The two frequencies sliding past each other is inherent in the amount of time required before attempting to lock the VCO based upon segment sync. The two thresholds of the inventive system optimize the segment sync recovery circuit. If the frequencies are far apart (>70 ppm), the confidence counter will not count too high before the sync pattern moves to the next location in the FIFO and causes the confidence counter to start over. Consequently, a large number reached by the confidence counter indicates that the frequencies are close and that the threshold may be adjusted to optimize the signal-to-noise performance.

The segment timing generator 700 can be reset if the value in confidence counter 710 is low. If the value is above the preset +32, extraneous outputs from comparator 600 will be rejected. If the value reached by the confidence counter is low, the timing generator may be reset on the next comparator output, and if the resetting of the timing generator represents a change in segment timing, the confidence counter will also be reset to the present value of 192.

When the frequency of VCO 29 is low during a reset of segment timing circuit 700, the last few decoding states may not be generated, which can cause difficulties for operations that are dependent upon them. To insure that all decoding states are available, the last few decodes are triggered by an early decode by decoder 722 followed by one symbol delay lines 724, 726 and 728, the output of which is supplied to inputs of AND gate 754, OR-gate 752 and XOR gate 756.

The preset value of 192 set in confidence counter 710 allows a fairly long "flywheel effect" during sync acquisition. As VCO 29 approaches the correct symbol frequency, there are long periods when there is no output from comparator 600 as sliding occurs from one location to the next in first in first out (FIFO) buffer 506. During this long beat note, VCO is not allowed to be reset to prevent nullification of the previous pull-in efforts. The long flywheel effect continues the proper timing pulses until the slide finds the next location in FIFO 506 and the frequency of VCO 29 will be substantially correct during the transition. If confidence counter 710 reaches zero, it is assumed that the signal has been lost and must be reacquired from the beginning. Thus the comparator threshold is returned to zero and the correlation outputs are returned to +2 for either polarity.

Although the procedure for finding a segment sync has been described with reference to FIG. 3, problems occur during the transmission of the VSB signals through air, that may prevent accurate and/or delay identification of segment sync location in actual applications. During the signal transmission, the original signal and segment sync patterns may be distorted due to noise, e.g., "white noise" and ghost signals, that distorts the original signal including segment sync patterns. The adverse effects of the white noise may be eliminated through algorithms at the receiver. However, ghost signals, such as reflections off of buildings and mountains, are difficult to eliminate, especially if the first 3 symbols of the sync pattern are affected. Therefore, the presence of ghost signals may detrimentally interfere in the search for segment sync pattern correlations.

As discussed above in FIGS. 4 and 6, when the enablement signal from timing counter 712 activates the confidence counter 710, the confidence counter 710 will decrease by one count if the control signal from the comparator 600 does not coincide with a predetermined count of the timing counter 712, until the confidence counter 710 attains a level of confidence to generate a segment lock signal. The segment lock signal then initiates other functions, for example the sync timing generator, the polarity correction, and frame sync recovery. However, if the ghost signal distorts the original sync pattern, the number of successful segment sync pattern correlations would decrease, thereby delaying a threshold necessary for the comparator 600 to output the control signal. Consequently, the enablement signal generated after each loop of the timing counter 712 which would less likely coincide with a delayed control signal from the comparator 600. Therefore, even if a symbol pattern was a true segment sync pattern, the confidence counter 710 would decrease by one count because the enablement signal from the counter would not coincide with the control signal. As a result, other functions at the VSB signal receiver which require the segment lock signal would not be able to function properly.

Figure 7:
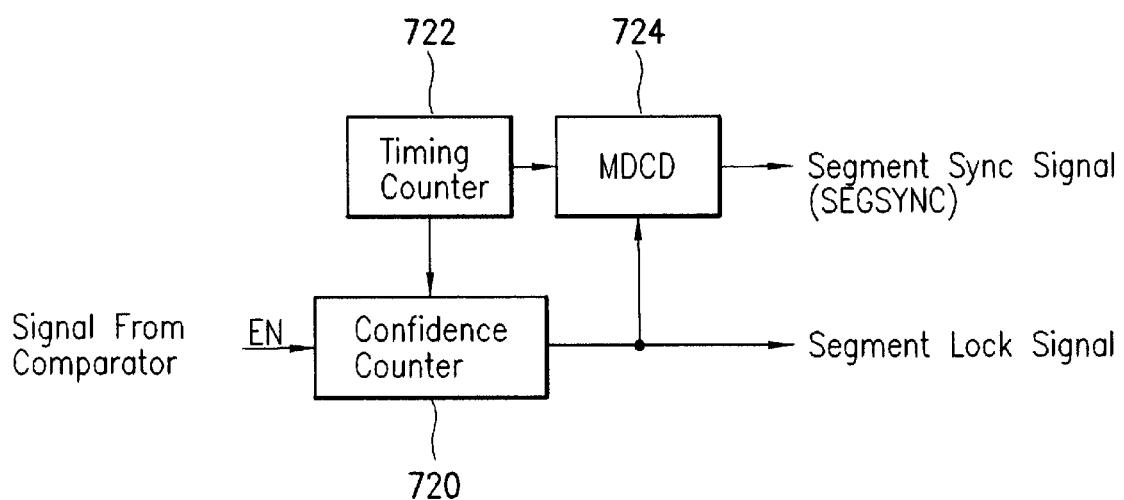
FIG. 7 is a simplified block diagram of a sync timing generator that incorporating another aspect of the invention.

FIG. 7 illustrates a preferred embodiment of the sync timing generator which compensates for the adverse affects of the ghost signals. The preferred embodiment includes a timing counter 722, a confidence counter 720, and multicount decoder 724. The output from the comparator 600, rather than the timing counter 722, generates the enablement signal. In the preferred embodiment, the control signal output by the comparator 600 to the confidence counter 720 is also used as an enablement signal for the confidence counter 720. For example, the timing counter 722 counts until an enablement signal is generated by the comparator 600, indicating a sync pattern correlation. At that point, the timing counter continues to count, and the confidence counter 720 increases the count by one while storing the count attained by the timing counter 722. Upon the generation of a subsequent enablement signal, if the timing counter 722 reaches the stored count, the confidence counter increase by another count. In effect, confidence counter 720 according to the present invention is not dependent upon each loop of the timing counter 722. Instead, only when the comparator 600 outputs an enablement signal, the confidence counter 720 checks for output of the timing control 722.

Because the confidence counter 720 is enabled by the comparator, even if the control signal from the comparator 600 is delayed, the confidence counter 720 would not be described by one count. As a result, the confidence counter 720 would efficiently attain the level of confidence necessary to generate a segment lock signal. Therefore the effects of the distortions cause by the ghost signal would not delay the initiation of other functions. Note that the confidence counter 720 only has two outputs, a signal to the multi count decoder 724 and a segment lock signal to the correlation 400. However, the confidence counter 720 can be coupled to a multi counter decoder as discussed in FIG. 6 to output multi levels of signals.

Figure 8:
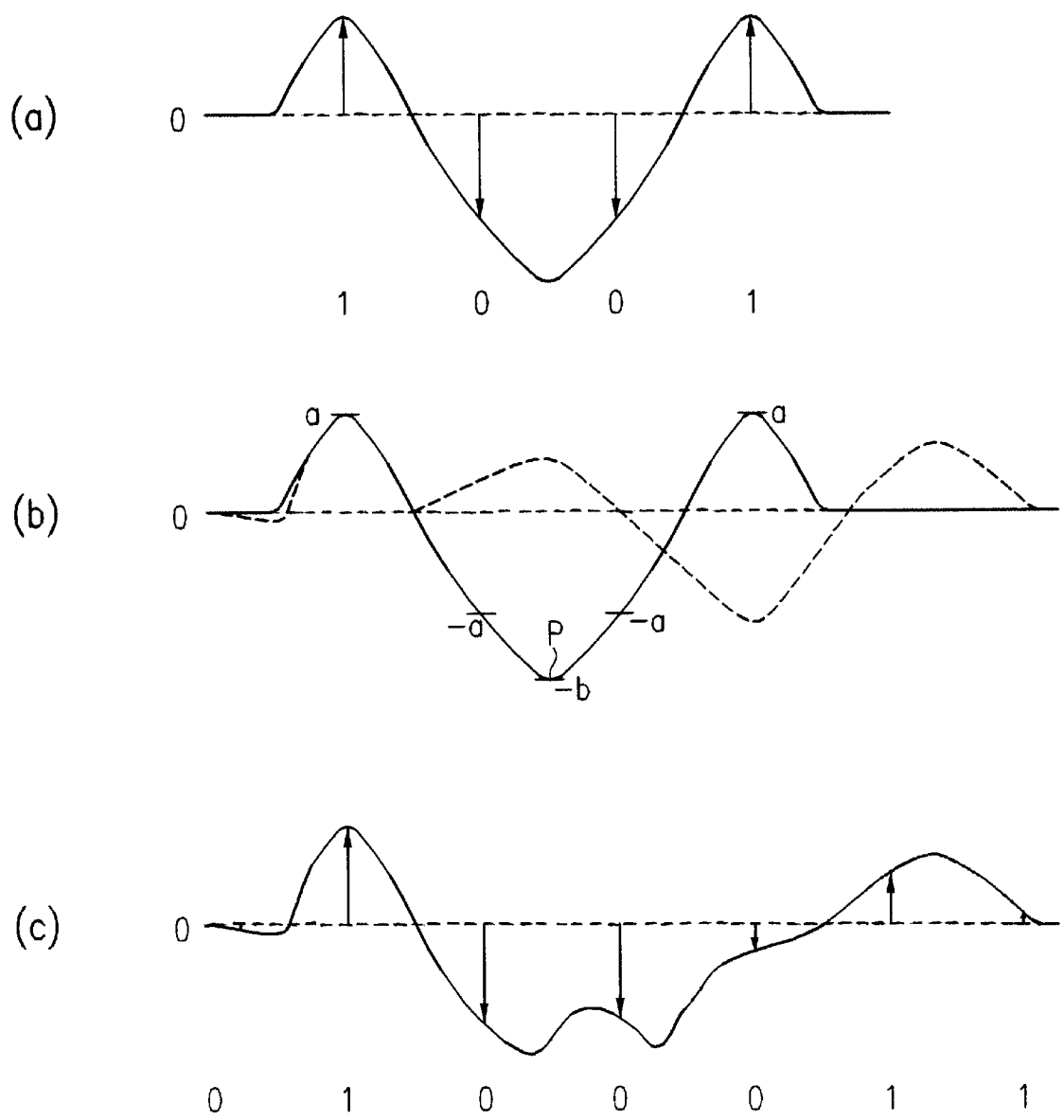
FIGS. 8(a)–(c) shows the effects of ghost static on a sync pattern.
Figure 9A:
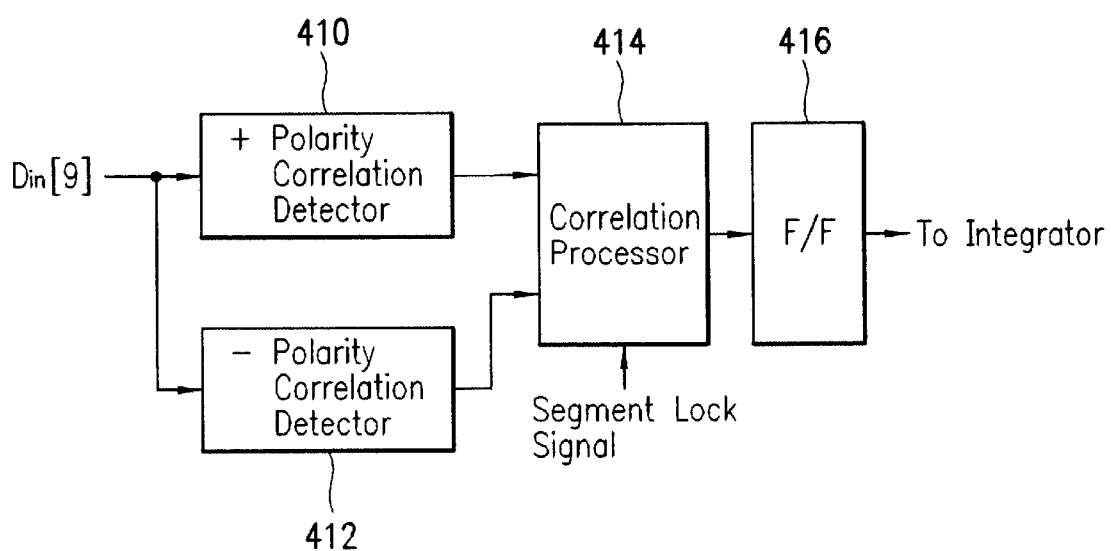
FIG. 9A is a block diagram of a correlator that incorporates the invention.

An improved correlating circuit may be also provided to further lessen the adverse impact of ghost signals. Referring to FIG. 8, part (c) shows the distortion of the original signal shown in part (a) by the ghost signal shown in part (b) in dashed lines. Particularly, the original signal pattern of '1001' or '0110' (for negative sync pattern) would be distorted to '1000' or '0111' respectively. Consequently, to account for the possible distortion, the correlating circuit should search for sync patterns of not only '1001' and '0110', but also '1000', '0001', '0111', '1110'. Referring to FIG. 9A, a correlator 400 according to the present invention includes a positive polarity correlation detector 410 for detecting positive correlations of '1001', '1000', '0001', a negative correlation detector 412 for detecting negative correlations of '0110', '0111', '1110', a correlation processor 414 for assigning a +2, a +1 or a −1 depending the correlation detected, and flip-flop 416 for timely outputting the results to the integrator 500.

However, detecting the above listed patterns may be inefficient because such patterns may commonly occur in non sync pattern locations as well. Thus, for further accuracy of the detection, the present invention provides a correlating circuit which would simultaneously detect the symbols adjacent to the segment sync location. Consequently, the correlator would additionally search for positive sync symbol patterns of '0100011' wherein the end of the original sync pattern was affected by ghost signals, '1100010' wherein the beginning of the original sync pattern was affected by ghost signals, and for negative sync symbol patterns of '0111100' wherein the end of the original sync pattern was affected by ghost signals, '0011101' wherein the beginning of the original sync pattern was affected by ghost signals. The above symbol patterns are chosen as the preferred pattern of a distorted sync symbol pattern, however, other distorted sync patterns may be used by the correlator in alternative embodiments.

Figure 9B:
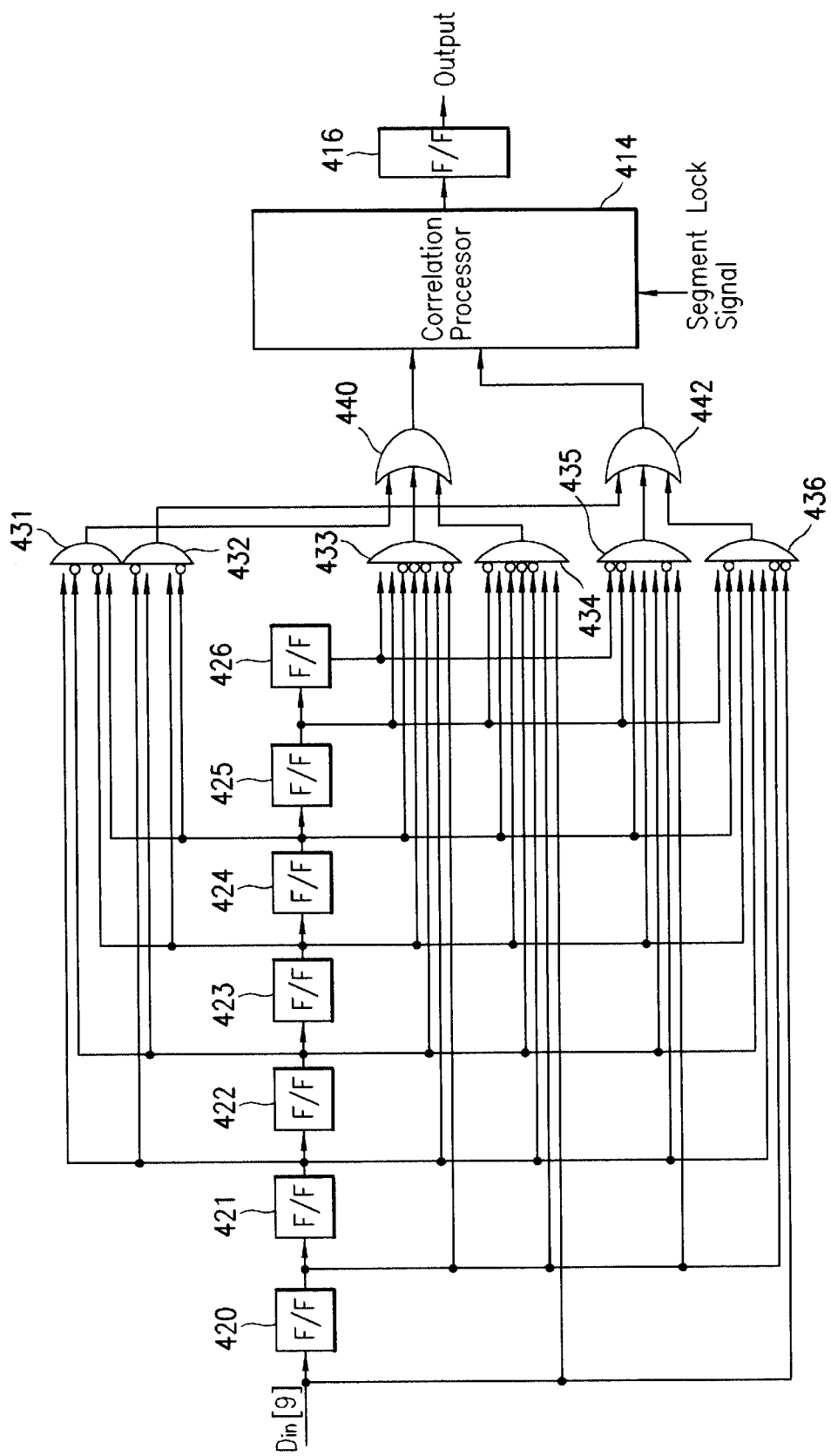
FIG. 9B is a circuit diagram for the positive and negative sync correlation detectors within the correlator.

FIG. 9B shows a detailed schematic of the correlator in accordance with the preferred embodiment of the present invention. The D input is processed through the polarity detecting circuit, including flip-flops 420–426, AND gates 431–436, OR gates 440–442 coupled to the correlation processor 414 for outputting potential sync symbol location, and flip-flop 416. Specifically, AND gate 431 outputs a '1' if the flip-flops. 421–424 detect a symbol pattern of '1001'. AND gate 432 outputs a '1' if the flip-flops 421–424 detect symbol pattern of '0110'. AND gate 433 outputs a '1' if the flip-flops 420–426 detect a symbol pattern of '0100011'. AND gate 434 outputs a '1' if the flip-flops 421–426 detect a symbol pattern of '1100010'. AND gate 435 outputs a '1' if the flip-flops 420–426 detect a symbol pattern of '1011100'. AND gate 436 outputs a '1' if the flip-flops through 420–425 detect a symbol pattern of '0011101'.

The AND gate 431 detects positive sync symbol patterns unaffected by ghost signals. AND gate 432 detects negative sync symbol patterns unaffected by ghost signals. AND gate 433 detects positive sync symbol patterns wherein the end of the original sync pattern was distorted by ghost signals. AND gate 434 detects positive sync symbol patterns wherein the beginning of the original sync pattern was distorted by ghost signals. AND gate 435 detects negative sync symbol patterns wherein the end of the original sync pattern was distorted by ghost signals. AND gate 436 detects negative sync symbol patterns wherein the beginning of the original sync pattern was distorted by ghost signals. The functions of the AND gates 431 through 436 are summarized in Table 1 below.

TABLE 1

| Non Sync Symbols | Sync Symbol Pattern | Non Sync Symbols | Affects of Ghost Signals | Detection |
|---|---|---|---|---|
| X X | 1 0 0 1 | X X | positive polarity, not distorted | AND gate 431 |
| X X | 0 1 1 0 | X X | negative polarity, not distorted | AND gate 432 |
| X 0 | 1 0 0 0 | 1 1 | positive polarity, end distorted | AND gate 433 |
| 1 1 | 0 0 0 1 | 0 X | positive polarity, beginning distorted | AND gate 434 |
| X 1 | 0 1 1 1 | 0 0 | positive polarity, end distorted | AND gate 435 |
| 0 0 | 1 1 1 0 | 1 X | negative polarity, beginning distorted | AND gate 436 |

The outputs of AND gates 431, 433, 434 are coupled to the OR gate 440. Outputs of AND gates 432, 435, 436 are coupled to the OR gate 442. OR gate 440 will output a '1' upon detecting any one of the positive sync symbol patterns listed above and OR gate 442 will output a '1' upon detecting any one of the negative sync symbol patterns listed above. Accordingly, OR gates 440 and 442 will output a '1' for a successful correlation, even if the original sync symbol pattern was distorted by ghost signals. By searching and detecting potentially distorted sync symbol patterns, the adverse effects of ghost signals can be eliminated.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A circuit for locating a predetermined pattern in a data signal, comprising:
    a control circuit that detects a sign bit from a sequence of data pattern in the data signal to output a control signal; and
    a generator coupled to the control circuit and being responsive to the control signal to generate an output signal indicative of a location of the predetermined pattern in the data signal in response to the control signal,
    wherein the predetermined pattern represents a data segment synchronization signal for providing synchronization for a vestigial sideband (VSB) signal.

2. The circuit of claim 1, wherein said generator comprises:
    a first counter outputting a count value as said first counter continuously counts from a first value to a second value;
    a second counter coupled to said first counter and being enabled by the control signal for changing a stored value if a previous count value detected from said first counter upon receipt of the control signal is equal to the count value detected from said first counter upon receipt of the control signal, said second counter generating a lock signal when the stored value is equal to a prescribed threshold value; and
    a decoder responsive to the lock signal from said second counter and selecting the count value from said first counter as the location of the predetermined pattern in the data signal upon receiving the lock signal.

3. The circuit of claim 1, wherein said control circuit comprises:
    a sequence detector that generates a prescribed signal indicative of a prescribed value based on the sequence of data pattern detected in the data signal; and
    a comparator that compares the prescribed value to a first prescribed threshold value, said comparator generating the control signal when the prescribed value meets a predetermined condition compared to the first prescribed threshold value.

4. The circuit of claim 3, wherein said generator comprises:
    a first counter outputting a count value as said first counter continuously counts from a first value to a second value;
    a second counter coupled to said first counter and being enabled by the control signal for changing a stored value if a previous count value detected from said first counter upon receipt of the control signal is equal to the count value detected from said first counter upon receipt of a subsequent control signal, said second counter generating at least a second control signal when the stored value is equal to a second prescribed threshold value; and
    a decoder responsive to said second control signal from said second counter, said decoder selecting and outputting the count value from said first counter as the location of the predetermined pattern in the data signal upon receiving the second control signal.

5. The circuit of claim 4, wherein said second counter generates a third control signal when the stored value is equal to a third prescribed threshold value.

6. The circuit of claim 5, wherein said comparator is coupled to said second counter, said comparator responsive to the third control signal and generating the control signal when the prescribed value meets a predetermined condition compared to a fourth prescribed threshold value.

7. The circuit of claim 6, wherein the control signal is generated when the prescribed value is equal to or greater than the fourth prescribed threshold value.

8. The circuit of claim 3, wherein the control signal is generated when the prescribed value is equal to or greater than the first prescribed threshold value.

9. The circuit of claim 3, wherein the said sequence detector comprises:
    a correlator receiving the data signal to detect the sequence of data pattern and generating a plurality of preset values based on the sequence of data pattern; and
    an integrator receiving the plurality of preset values, said integrator adding the plurality of preset values for each corresponding prescribed period of time to output the prescribed signal.

10. The circuit of claim 9, wherein said correlator comprises:
   a correlation detector receiving the data signal to detect the sequence of data pattern; and
   a value selector outputting the plurality of preset values based on the sequence of data pattern.

11. The circuit of claim 10, wherein said correlator further comprises a latch coupled to said value selector.

12. The circuit of claim 10, wherein said correlation detector comprises:
   a positive polarity correlation detector detecting the sequence of data pattern with a positive polarity; and
   a negative polarity correlation detector detecting the sequence of data pattern with a negative polarity.

13. The circuit of claim 12, wherein said value selector assigns equal weighting values to the sequence detected for both the positive and negative polarity.

14. The circuit of claim 13, wherein said generator coupled to said control circuit also outputs a segment lock signal; and said value selector coupled to said generator and responsive to the segment lock signal to assign different weighting values to the sequence detected for the positive and negative polarity.

15. The circuit of claim 1, wherein the synchronization for the VSB signal is provided based on the sign bit alone, which is detected from the sequence of the data pattern in the data signal.

16. A method for locating a predetermined pattern in a data signal, the method comprising:
   detecting a sign bit from a sequence of data pattern in the data signal to output a control signal; and
   generating an output signal indicative of a location of the predetermined pattern in the data signal in response to the control signal,
   wherein the predetermined pattern represents a data segment synchronization signal for providing synchronization for a vestigial sideband (VSB) signal.

17. The method of claim 16, wherein the synchronization for the VSB signal is provided based on the sign bit alone, which is detected from the sequence of the data pattern in the data signal.

18. A circuit for locating a predetermined pattern in a data signal, comprising:
   a control circuit that detects a sequence of data pattern in the data signal to output a control signal; and
   a generator coupled to the control circuit and being responsive to the control signal to generate an output signal indicative of a location of the predetermined pattern in the data signal in response to the control signal,
   wherein said generator comprises:
      a first counter outputting a count value as said first counter continuously counts from a first value to a second value;
      a second counter coupled to said first counter and being enabled by the control signal for changing a stored value if a previous count value detected from said first counter upon receipt of the control signal is equal to the count value detected from said first counter upon receipt of the control signal, said second counter generating a lock signal when the stored value is equal to a prescribed threshold value; and
      a decoder responsive to the lock signal from said second counter and selecting the count value from said first counter as the location of the predetermined pattern in the data signal upon receiving the lock signal.

19. A circuit for locating a predetermined pattern in a data signal, comprising:
   a control circuit that detects a sequence of data pattern in the data signal to output a control signal; and
   a generator coupled to the control circuit and being responsive to the control signal to generate an output signal indicative of a location of the predetermined pattern in the data signal in response to the control signal,
   wherein said control circuit comprises:
      a sequence detector that generates a prescribed signal indicative of a prescribed value based on the sequence of data pattern detected in the data signal; and
      a comparator that compares the prescribed value to a first prescribed threshold value, said comparator generating the control signal when the prescribed value meets a predetermined condition compared to the first prescribed threshold value; and
      wherein the control signal is generated when the prescribed value is equal to or greater than the first prescribed threshold value.

20. A circuit for locating a predetermined pattern in a data signal, comprising:
   a control circuit that detects a sequence of data pattern in the data signal to output a control signal; and
   a generator coupled to the control circuit and being responsive to the control signal to generate an output signal indicative of a location of the predetermined pattern in the data signal in response to the control signal,
   wherein said control circuit comprises:
      a sequence detector that generates a prescribed signal indicative of a prescribed value based on the sequence of data pattern detected in the data signal; and
      a comparator that compares the prescribed value to a first prescribed threshold value, said comparator generating the control signal when the prescribed value meets a predetermined condition compared to the first prescribed threshold value; and
      wherein said sequence detector comprises:
         a correlator receiving the data signal to detect the sequence of data pattern and generating a plurality of preset values based on the sequence of data pattern; and
         an integrator receiving the plurality of preset values, said integrator adding the plurality of preset values for each corresponding prescribed period of time to output the prescribed signal.

* * * * *